United States Patent
Higuchi et al.

(10) Patent No.: US 11,235,743 B2
(45) Date of Patent: Feb. 1, 2022

(54) VEHICLE, VEHICLE IDENTIFICATION SYSTEM, VEHICLE IDENTIFICATION METHOD, PROGRAM, AND METHOD FOR ATTACHING ONBOARD UNIT

(71) Applicant: MITSUBISHI HEAVY INDUSTRIES MACHINERY SYSTEMS, LTD., Hyogo (JP)

(72) Inventors: Tatsuya Higuchi, Tokyo (JP); Kazuyoshi Kitajima, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 300 days.

(21) Appl. No.: 16/498,036

(22) PCT Filed: Mar. 29, 2017

(86) PCT No.: PCT/JP2017/012999
§ 371 (c)(1),
(2) Date: Sep. 26, 2019

(87) PCT Pub. No.: WO2018/179163
PCT Pub. Date: Oct. 4, 2018

(65) Prior Publication Data
US 2020/0055498 A1 Feb. 20, 2020

(51) Int. Cl.
*H04B 7/00* (2006.01)
*G08B 1/00* (2006.01)
(Continued)

(52) U.S. Cl.
CPC .......... *B60T 8/1708* (2013.01); *B60T 7/20* (2013.01); *B60T 8/248* (2013.01); *G07B 15/063* (2013.01);
(Continued)

(58) Field of Classification Search
None
See application file for complete search history.

(56) References Cited

U.S. PATENT DOCUMENTS 10,269,186 B2 * 4/2019 Ieuji .................. G07B 15/00
10,854,023 B1 * 12/2020 Trinh ................. H04L 27/0002
(Continued)

FOREIGN PATENT DOCUMENTS

JP   H09167985 A   6/1997

OTHER PUBLICATIONS

International Search Report and Written Opinion of International Application No. PCT/JP2017/012999 dated Jun. 13, 2017; 9pp.

*Primary Examiner* — Adam D Tissot
(74) *Attorney, Agent, or Firm* — Kanesaka Berner and Partners LLP

(57) ABSTRACT

A vehicle is provided with: a main vehicle body having an attachment portion to which a towed vehicle can be attached, and a first onboard unit and a second onboard unit attached to the main vehicle body, the first onboard unit and the second onboard unit being installed so as to be capable of communicating with a roadside device. The first onboard unit has type information relating to the type of the main vehicle body, and is provided at a position at which communication with the roadside device is possible both when the towed vehicle is attached to the attachment portion and when the towed vehicle is not attached to the attachment portion. The second onboard unit is provided at a position at which communication with the roadside device is possible when the towed vehicle is not attached to the attachment portion and at which communication with the roadside device is not possible when the towed vehicle is attached to the attachment portion.

5 Claims, 10 Drawing Sheets

(51) Int. Cl.

| | |
|---|---|
| *G06Q 10/00* | (2012.01) |
| *G07C 5/00* | (2006.01) |
| *H04L 27/00* | (2006.01) |
| *H04L 29/08* | (2006.01) |
| *B60T 8/17* | (2006.01) |
| *H04W 4/44* | (2018.01) |
| *B60T 7/20* | (2006.01) |
| *B60T 8/24* | (2006.01) |
| *G07B 15/06* | (2011.01) |

(52) U.S. Cl.
CPC .............. *G07C 5/008* (2013.01); *H04W 4/44* (2018.02); *B60T 2230/00* (2013.01)

(56) References Cited

U.S. PATENT DOCUMENTS

| | | | | |
|---|---|---|---|---|
| 10,878,305 | B1* | 12/2020 | Ziegler | ............... H04W 84/042 |
| 2004/0207514 | A1* | 10/2004 | Lesesky | .............. B60R 16/0315 |
| | | | | 340/431 |
| 2011/0246263 | A1* | 10/2011 | Spannagl | ............. G07B 15/063 |
| | | | | 705/13 |
| 2011/0281522 | A1* | 11/2011 | Suda | .................. G06Q 10/0833 |
| | | | | 455/41.2 |
| 2019/0064828 | A1* | 2/2019 | Meredith | ............. G05D 1/0242 |

* cited by examiner

VEHICLE, VEHICLE IDENTIFICATION SYSTEM, VEHICLE IDENTIFICATION METHOD, PROGRAM, AND METHOD FOR ATTACHING ONBOARD UNIT

RELATED APPLICATIONS

The present application is a National Phase of International Application Number PCT/JP2017/012999 filed Mar. 29, 2017.

TECHNICAL FIELD

The present invention relates to a vehicle, a vehicle identification system, a vehicle identification method, a program, and a method for attaching an onboard unit.

BACKGROUND ART

Currently, on toll roads such as expressways, it is known that a toll (a toll charge) is charged of an amount corresponding to the vehicle type classification of a traveling vehicle.

As a related technology, Patent Document 1 discloses a toll charging system that automatically identifies a traveling vehicle using Radio Frequency Identification (RFID).

CITATION LIST

Patent Document

Patent Document 1: JP 09-167985 A

SUMMARY OF INVENTION

Technical Problem

However, when the traveling vehicle is a towing vehicle, when using only the equipment as described in Patent Document 1, it is possible to identify the fact that the vehicle is the towing vehicle but it is not possible to identify whether the towing vehicle is towing or is not towing a towed vehicle. Therefore, in order to charge the toll corresponding to the presence or absence of the towed vehicle, it is necessary, for example, to separately provide a device for determining the presence or absence of the towed vehicle, causing equipment to be large-scale.

Therefore, an object of the present invention is to provide a vehicle, a vehicle identification system, a vehicle identification method, a program, and a method for attaching an onboard unit that are capable of identifying the presence or absence of a towed vehicle using small scale equipment.

Solution to Problem

A vehicle (20, 20') of a first aspect includes a main vehicle body (20A) including an attachment portion (20C) to which a towed vehicle (20B) is attachable, and a first onboard unit (41A) and a second onboard unit (41B) that are attached to the main vehicle body and disposed so as to be capable of communicating with a roadside device (40). The first onboard unit holds type information relating to a type of the main vehicle body and is provided at a position at which the first onboard unit is capable of communicating with the roadside device in a state in which the towed vehicle is attached to the attachment portion and in a state in which the towed vehicle is not attached. The second onboard unit is provided at a position at which the second onboard unit is capable of communicating with the roadside device in the state in which the towed vehicle is not attached to the attachment portion and is not capable of communicating with the roadside device in the state in which the towed vehicle is attached to the attachment portion.

According to the present aspect, a communication state between the second onboard unit of the main vehicle body and the roadside device switches depending on the presence or absence of the towed vehicle. Therefore, the second onboard unit of the main vehicle body becomes unable to communicate with the roadside device in the state in which the towed vehicle is attached, and is able to communicate with the roadside device in the state in which the towed vehicle is not attached. Thus, the vehicle can receive a determination about the presence or absence of the towed vehicle, using small scale equipment.

A vehicle of a second aspect is the vehicle according to the first aspect in which the second onboard unit includes an RFID tag.

According to this aspect, by the vehicle using the RFID tag in the communication with the roadside device, the onboard unit itself and the roadside device can be configured at a low cost.

A vehicle of a third aspect is the vehicle according to the first or second aspect in which, in the state in which the towed vehicle is attached to the attachment portion, the second onboard unit is electromagnetically shielded by the towed vehicle so as to be incapable of communicating with the roadside device.

According to this aspect, the second onboard unit of the main vehicle body utilizes electromagnetic shielding to switch the communication state with the roadside device.

Accordingly, the vehicle can cause the communication between the second onboard unit and the roadside device to be impossible, in conjunction with the attachment of the towed vehicle to the attachment portion of the main vehicle body.

A vehicle identification system (10, 10') of a fourth aspect includes: a roadside device configured to receive, from a first onboard unit attached to a main vehicle body, which is a main vehicle body of a vehicle and which includes an attachment portion to which a towed vehicle is attachable, first information (DA) including type information relating to a type of the main vehicle body, and configured to receive second information (DB) from a second onboard unit attached to the main vehicle body; a first information processing unit (51A) configured to acquire the first information from the roadside device and to identify the type of the main vehicle body from the type information; a second information processing unit (51B) configured to initiate, in relation to the identified type, a standby for the second information from the roadside device; and a towing determination unit (51C) configured to determine that the main vehicle body is not towing the towed vehicle when the second information processing unit acquires the second information, and configured to determine that the main vehicle body is towing the towed vehicle when the second information processing unit does not acquire the second information.

According to the present aspect, a communication state between the second onboard unit of the main vehicle body and the roadside device switches depending on the presence or absence of the towed vehicle. Therefore, in the vehicle identification system, the communication with the second onboard unit of the main vehicle body is impossible in the state in which the towed vehicle is attached, and the communication with the second onboard unit of the main vehicle body is possible in the state in which the towed vehicle is not attached.

Therefore, the presence or absence of the towed vehicle can be determined from an acquisition state of the communication, and thus the vehicle identification system can determine the presence or absence of the towed vehicle using small scale equipment.

A vehicle identification method of a fifth aspect includes: a first information processing step of acquiring, from a first onboard unit attached to a main vehicle body, which is a main vehicle body of a vehicle and which includes an attachment portion to which a towed vehicle is attachable, first information including type information relating to a type of the main vehicle body, and identifying a type of the main vehicle body from the type information; a second information processing step of initiating, in relation to the identified type, a standby for second information from a second onboard unit attached to the main vehicle body; a second information processing step configured to initiate, in relation to the identified type, a standby for the second information from the roadside device; and a towing determining step of determining that the main vehicle body is not towing the towed vehicle when the second information is acquired in the second information processing step, and determining that the main vehicle body is towing the towed vehicle when the second information is not acquired in the second information processing step.

According to the present aspect, a communication state between the second onboard unit of the main vehicle body and the roadside device switches depending on the presence or absence of the towed vehicle. Therefore, in the vehicle identification method, the communication with the second onboard unit of the main vehicle body is impossible in the state in which the towed vehicle is attached, and the communication with the second onboard unit of the main vehicle body is possible in the state in which the towed vehicle is not attached.

Therefore, the presence or absence of the towed vehicle can be determined from the acquisition state of the communication, and thus the vehicle identification method can determine the presence or absence of the towed vehicle using small scale equipment.

A program of a sixth aspect causes a computer of a vehicle identification system including a roadside device that receives, from a first onboard unit attached to a main vehicle body, which is a main vehicle body of a vehicle and which includes an attachment portion to which a towed vehicle is attachable, first information including type information relating to a type of the main vehicle body, and that receives second information from a second onboard unit attached to the main vehicle body, to function as: a first information processing unit configured to acquire the first information from the roadside device and identify the type of the main vehicle body from the type information; a second information processing unit configured to initiate, in relation to the identified type, a standby for the second information from the roadside device; and a towing determination unit configured to determine that the main vehicle body is not towing the towed vehicle when the second information processing unit acquires the second information, and configured to determine that the main vehicle body is towing the towed vehicle when the second information processing unit does not acquire the second information.

According to the present aspect, a communication state between the second onboard unit of the main vehicle body and the roadside device switches depending on the presence or absence of the towed vehicle. Therefore, in the vehicle identification system, the communication with the second onboard unit of the main vehicle body is impossible in the state in which the towed vehicle is attached, and the communication with the second onboard unit of the main vehicle body is possible in the state in which the towed vehicle is not attached.

Accordingly, the program functions so as to enable the computer of vehicle identification system to determine the presence or absence of the towed vehicle from the acquisition state of the communication, using small scale equipment.

A method for attaching of a seventh aspect is a method for attaching an onboard unit installed on a main vehicle body, which is a main vehicle body of a vehicle and which includes an attachment portion to which a towed vehicle is attachable, so as to be able to identify a type of the main vehicle body through communication with a roadside device. The method for attaching the onboard unit includes: a first onboard unit installing step of installing a first onboard unit, which holds type information relating to the type of the main vehicle body, in a position at which the first onboard unit is capable of communicating with the roadside device in a state in which the towed vehicle is attached to the attachment portion and in a state in which the towed vehicle is not attached; and a second onboard unit installing step of installing a second onboard unit in a position at which the second onboard unit is capable of communicating with the roadside device in the state in which the towed vehicle is not attached to the attachment portion and is not capable of communicating with the roadside device in the state in which the towed vehicle is attached to the attachment portion.

According to the present aspect, the method for attaching can provide the second onboard unit of the main vehicle body such that the communication state between the second onboard unit of the main vehicle body and the roadside device is switched depending on the presence or absence of the towed vehicle. Therefore, the provided second onboard unit of the main vehicle body becomes incapable of communicating with the roadside device when the towed vehicle is attached, and is capable of communicating with the roadside device in the state in which the towed vehicle is not attached.

Accordingly, in the method for attaching, the vehicle can be configured so as to be able to receive the determination of the presence or absence of the towed vehicle, using small scale equipment.

Advantageous Effect of Invention

According to an aspect of the present invention, the presence or absence of a towed vehicle can be determined using small scale equipment.

DESCRIPTION OF EMBODIMENTS

Embodiments of the present invention are described below with reference to the accompanying drawings.

First Embodiment

A first embodiment of a charging system according to the present invention will be described with reference to FIGS. 1 to 8.

Overall Configuration

An overall configuration of a charging system 100 will be described below.

Figure 1:
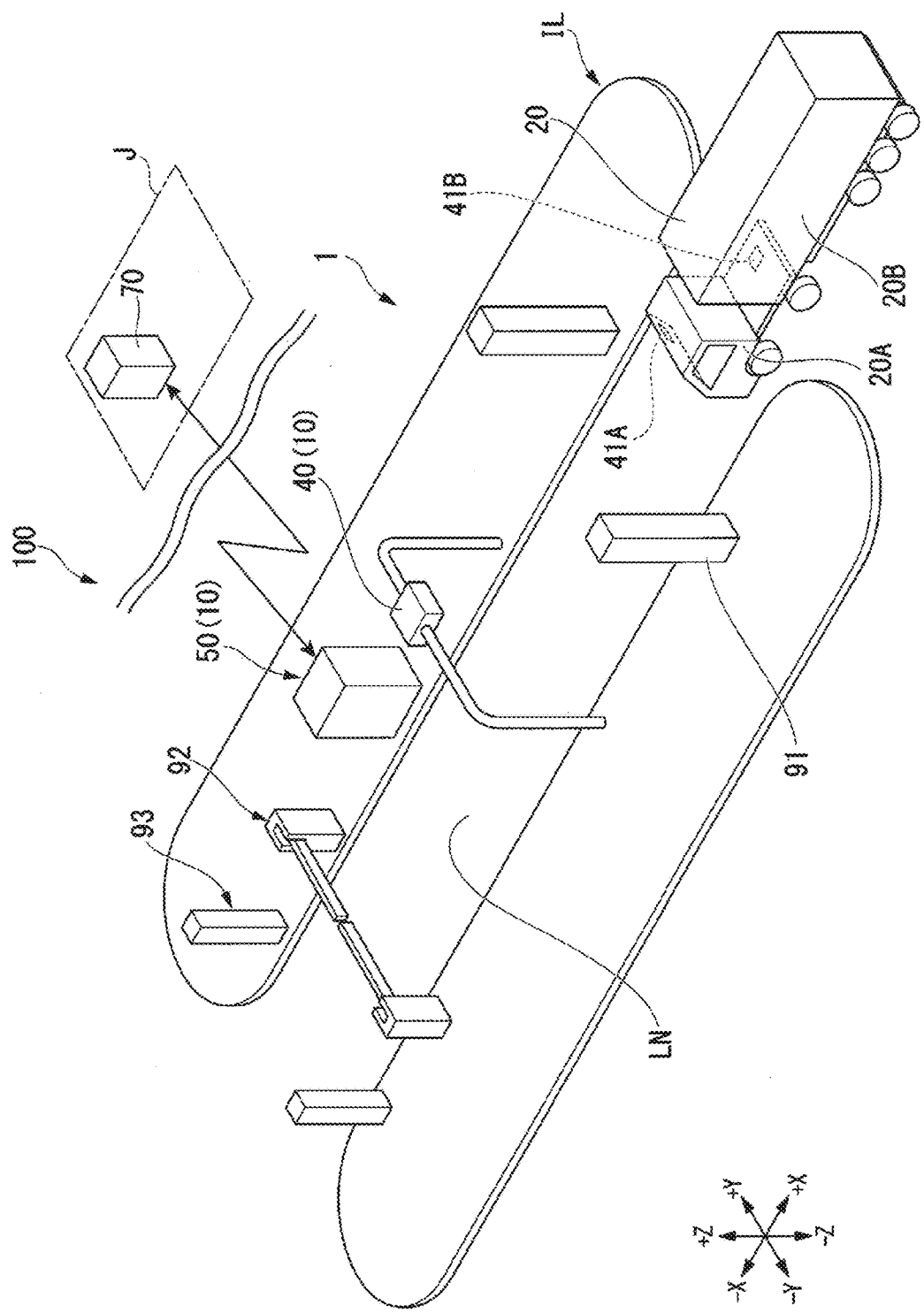
FIG. 1 is a schematic view of a charging system according to a first embodiment of the present invention.

As illustrated in FIG. 1, the charging system 100 includes a toll collection facility 1 and a central payment processor 70.

The toll collection facility 1 is provided at an exit tollgate (or an entry tollgate for some types of toll system) of an expressway, which is a toll road. The toll collection facility 1 is a facility for collecting, from a user of the expressway, a toll of an amount corresponding to a vehicle 20 the user is driving.

In the charging system 100 provided at the exit tollgate, the vehicle 20 is traveling on a lane LN that extends from an expressway side to a general road side. Islands IL are laid on both sides of the lane LN. Various devices that configure the toll collection facility 1 are installed on the islands IL.

Hereinafter, the direction in which the lane LN extends (a±X direction in FIG. 1) is referred to as a "lane direction." Further, the expressway side of the lane LN in the lane direction (the +X direction side in FIG. 1) is also referred to as an "upstream side." Furthermore, the general road side of the lane LN in the lane direction (the −X direction side in FIG. 1) is also referred to as a "downstream side."

Further, the width direction of the lane LN is referred to as a lane width direction (a±Y direction in FIG. 1), and the height direction of the vehicle 20 is referred to as a vertical direction (a±Z direction in FIG. 1).

As illustrated in FIG. 1, the toll collection facility 1 includes a vehicle identification system 10, an entry-side vehicle detector 91, a departure controller 92, and a departure-side vehicle detector 93.

The toll collection facility 1 is a device configured to perform wireless communication processing (hereinafter simply referred to as "wireless communication") with the vehicle 20 trying to pass through the exit tollgate, and perform charge processing corresponding to the type of the vehicle 20.

The vehicle identification system 10 includes an RFID reader 40 (a roadside device) and a charging communication processor 50. In the present embodiment, the vehicle identification system 10 determines the presence or absence of a towed vehicle from a communication acquisition state, using a configuration to be described below. Furthermore, the vehicle identification system 10 identifies the vehicle type and decides the toll of the amount corresponding to the identified vehicle type and the presence or absence of the towed vehicle, as a transit toll.

In the present embodiment, in the toll collection facility 1, the entry-side vehicle detector 91, the RFID reader 40, the charging communication processor 50, the departure controller 92, and the departure-side vehicle detector 93 are provided on the roadside in this order from the upstream side to the downstream side.

The RFID reader 40 is installed above the traveling vehicle 20.

When the entry of the vehicle 20 is detected by the entry-side vehicle detector 91, the RFID reader 40 performs wireless communication with a first RFID tag 41A to be described below, and receives first information DA that includes vehicle ID information and vehicle type information of a main vehicle body 20A to be described below.

Furthermore, the RFID reader 40 performs wireless communication with a second RFID tag 41B to be described below, and receives second information DB that includes the vehicle ID information of the main vehicle body 20A to be described below.

The RFID reader 40 is formed so as to be capable of transmitting and receiving electromagnetic waves in a predetermined frequency band (a UHF band, a microwave frequency band, or the like), and performs wireless communication, via the electromagnetic waves, with the first RFID tag 41A and the second RFID tag 41B mounted on the main vehicle body 20A that has arrived.

The charging communication processor 50 is a processing unit that executes a series of charge processing by the toll collection facility 1. In the present embodiment, a program to be described below is executed, thus causing a computer to function as the charging communication processor 50.

The charging communication processor 50 receives the first information DA and the second information DB of the vehicle 20 received by the RFID reader 40, from the RFID reader 40 via wired or wireless communication.

As illustrated in FIG. 1, the charging communication processor 50 outputs the acquired information, information relating to a decided toll charge amount, and the like to a central payment processor 70 (a host device) installed at a remote location J, via a communication circuit.

The entry-side vehicle detector 91 determines the presence or absence of the vehicle 20 (the vehicle body) traveling along the lane LN, using a light projecting tower and a light receiving tower that are located on the islands IL so as to face each other across the lane LN in the lane width direction (the ±Y direction), thus detecting, as vehicle passage information, the passing (entry) of one vehicle at a predetermined position.

The departure controller 92 is located on the downstream side of the lane LN and is a device that controls the departure of the vehicle 20 traveling along the lane LN. For example, when the charge processing of the vehicle 20 has not been normally performed, the departure controller 92 closes the lane LN so as to restrict the departure of the vehicle 20.

When the charge processing of the vehicle 20 has been normally completed, the departure controller 92 opens the lane LN.

In the present embodiment, the toll collection facility 1 includes the departure controller 92, but when the toll collection facility 1 does not need to restrict the departure of the vehicle 20, the toll collection facility 1 need not necessarily include the departure controller 92.

The departure-side vehicle detector 93 is located furthermost to the downstream side of the lane LN and detects the departure of the vehicle 20 from the toll collection facility 1.

Vehicle Configuration

The vehicle 20 includes the main vehicle body 20A, the first RFID tag 41A (a first onboard unit), and the second RFID tag 41B (a second onboard unit).

The first RFID tag 41A and the second RFID tag 41B are attached to the main vehicle body 20A and are installed so as to be capable of communicating with the RFID reader 40.

Figure 2:
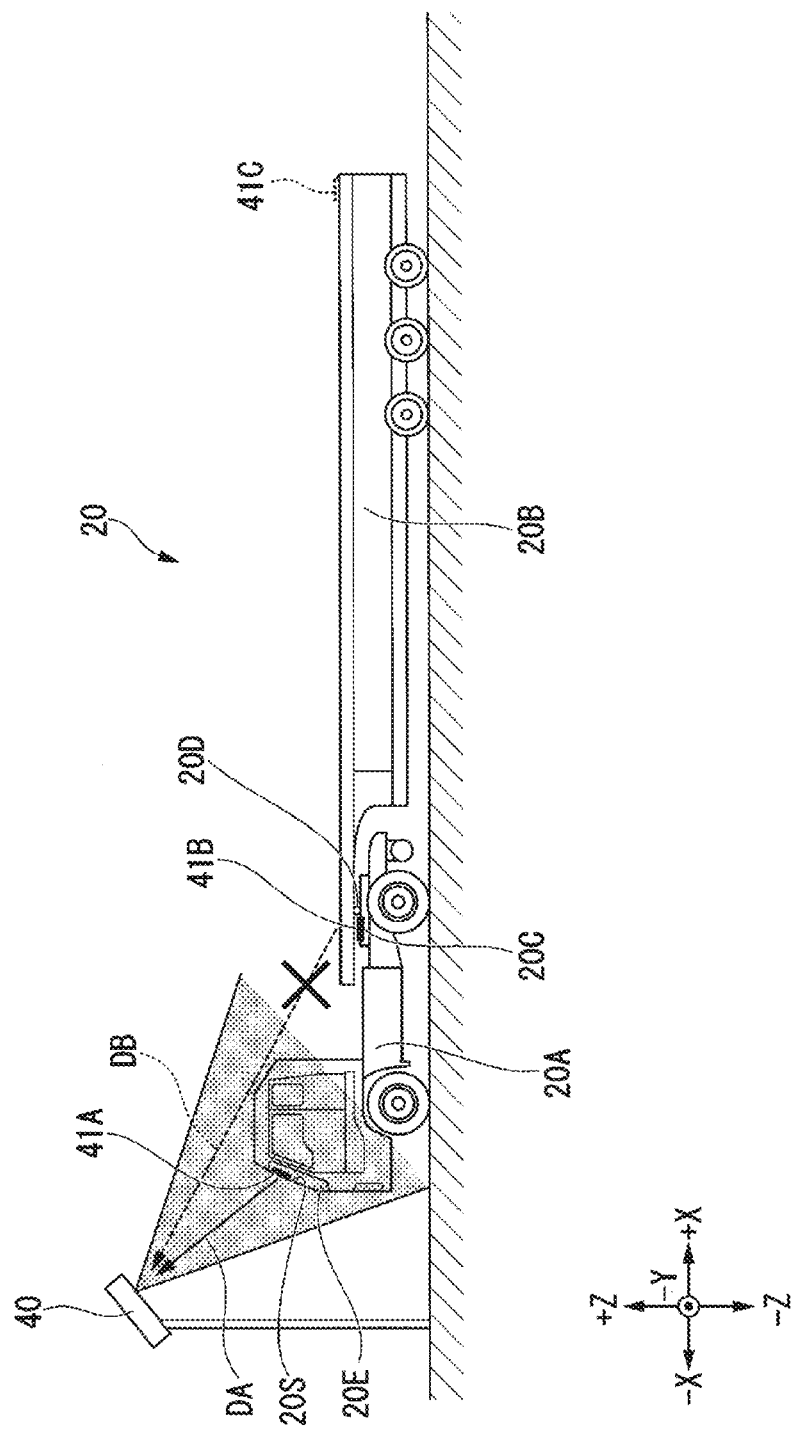
FIG. 2 is a diagram illustrating a relationship (when towing) between an RFID tag and an RFID reader according to the first embodiment of the present invention.
Figure 3:
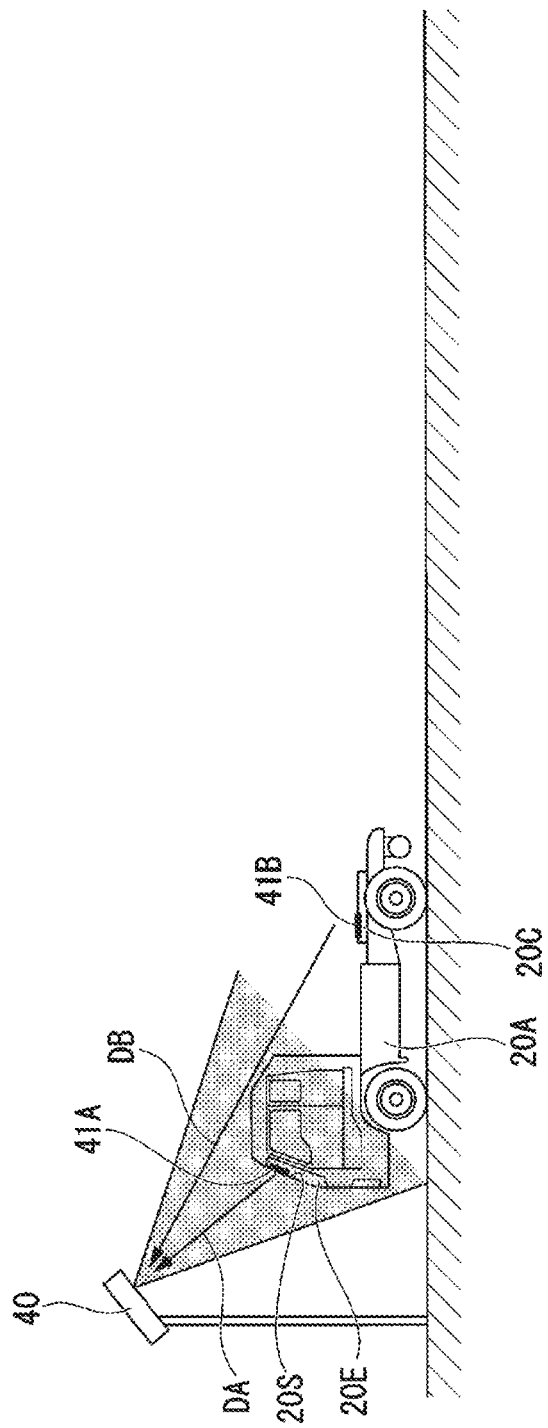
FIG. 3 is a diagram illustrating a relationship (when not towing) between the RFID tag and the RFID reader according to the first embodiment of the present invention.
Figure 4:
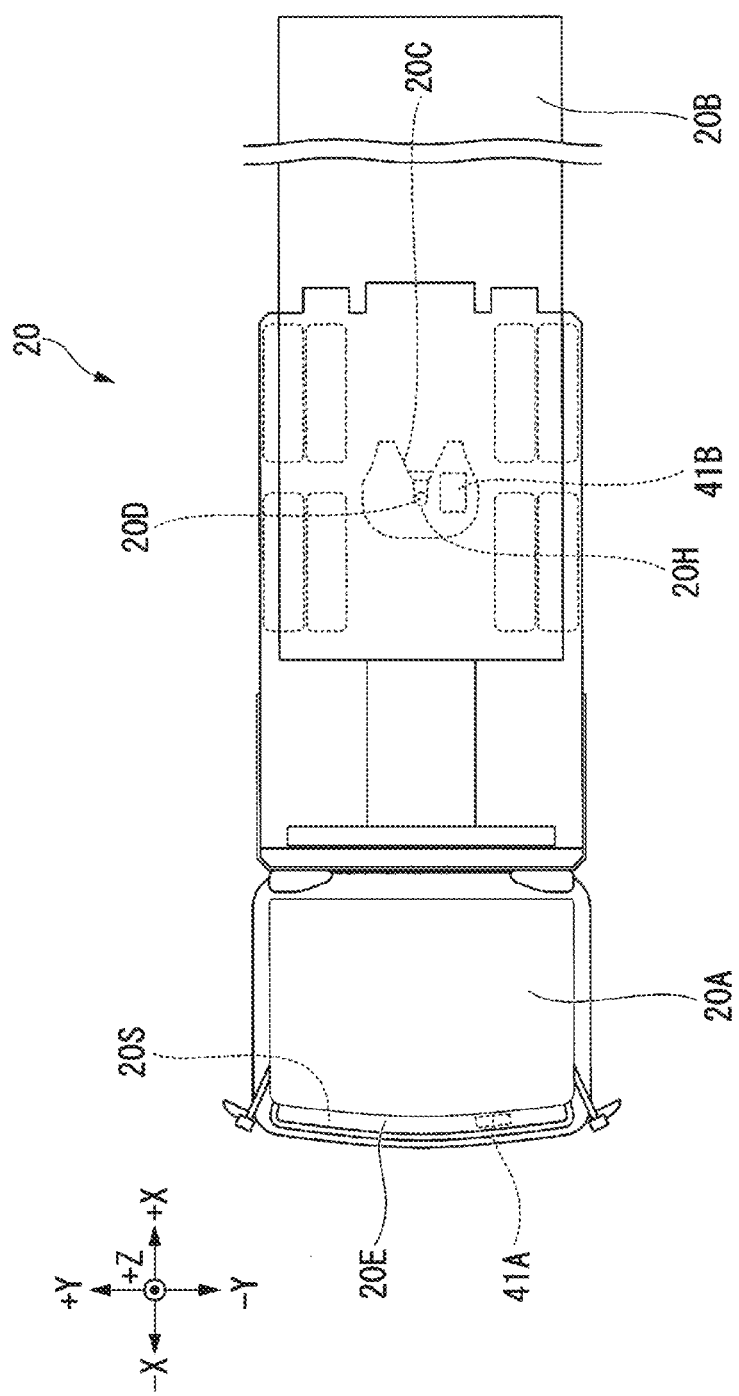
FIG. 4 is a plan view of a vehicle according to the first embodiment of the present invention.

As illustrated in FIGS. 2 and 3, the main vehicle body 20A includes an attachment portion 20C to which a towed vehicle 20B can be attached. Specifically, as illustrated in FIG. 4, the towed vehicle 20B includes an attachment pin 20D, and the attachment portion 20C includes an aperture 20H. By the attachment pin 20D being fitted into the aperture 20H, the towed vehicle 20B is attached to the main vehicle body 20A and is towed by the main vehicle body 20A.

When the main vehicle body 20A tows the towed vehicle 20B, the main vehicle body 20A travels in a state in which the towed vehicle 20B is attached to the attachment portion 20C. Additionally, when the main vehicle body 20A does not tow the towed vehicle 20B, the main vehicle body 20A travels in a state in which the towed vehicle 20B is not attached to the attachment portion 20C.

The first RFID tag 41A is an RFID tag used for identifying the vehicle type of the main vehicle body 20A. The first information DA, which includes the vehicle ID information and the vehicle type information (type information) of the main vehicle body 20A in which the first RFID tag 41A is installed, is stored in the first RFID tag 41A so as to be readable by the RFID reader 40.

The second RFID tag 41B is an RFID tag used for determining the presence or absence of the towed vehicle 20B. The second information DB, which includes the vehicle ID information of the main vehicle body 20A in which the second RFID tag 41B is installed, is stored in the second RFID tag 41B so as to be readable by the RFID reader 40.

The first information DA read from the first RFID tag 41A and the second information DB read from the second RFID tag 41B are paired in the charging communication processor 50. While the vehicle ID information may be used for the pairing, pairing information may also be used by which the first RFID tag 41A and the second RFID tag 41B can mutually identify each other.

For example, individual information of the second RFID tag 41B is stored in the first RFID tag 41A so as to be readable by the RFID reader 40. Further, individual information of the first RFID tag 41A is stored in the second RFID tag 41B so as to be readable by the RFID reader 40. In this way, the charging communication processor 50 can pair the first information DA read from the first RFID tag 41A and the second information DB read from the second RFID tag 41B.

The first RFID tag 41A is provided in a position so as to be capable of communicating with the RFID reader 40 in both the state in which the towed vehicle 20B is attached to the attachment portion 20C of the main vehicle body 20A and the state in which the towed vehicle 20B is not attached.

In the present embodiment, the first RFID tag 41A is attached to an inner surface 20S of a windshield 20E of the main vehicle body 20A. Here, of both surfaces of the windshield 20E of the main vehicle body 20A, the inner surface 20S is a surface on the inside of the main vehicle body 20A.

Thus, as illustrated in FIGS. 2 and 3, the first RFID tag 41A is capable of communicating with the RFID reader 40 regardless of whether the vehicle body 20A is towing or not towing the towed vehicle 20B.

The second RFID tag 41B is in a position so as to be capable of communicating with the RFID reader 40 in the state in which the towed vehicle 20B is not attached to the attachment portion 20C of the main vehicle body 20A, while also being provided in a position so as be incapable of communicating with the RFID reader 40 in the state in which the towed vehicle 20B is attached to the attachment portion 20C.

In the present embodiment, the second RFID tag 41B is attached to the attachment portion 20C of the main vehicle body 20A. Thus, the second RFID tag 41B is configured such that when the towed vehicle 20B is attached to the attachment portion 20C, the upper side of the second RFID tag 41B is covered by the towed vehicle 20B and the second RFID tag 41B is electromagnetically shielded from the RFID reader 40 that is installed on the roadside above the traveling vehicle 20. On the other hand, in the state in which the towed vehicle 20B is not attached to the attachment portion 20C of the main vehicle body 20A, the second RFID tag 41B is not electromagnetically shielded from the RFID reader 40.

Thus, as illustrated in FIG. 2, when the main vehicle body 20A is towing the towed vehicle 20B, the second RFID tag 41B cannot communicate with the RFID reader 40. Also, as illustrated in FIG. 3, when the main vehicle body 20A is not towing the towed vehicle 20B, the second RFID tag 41B can communicate with the RFID reader 40.

The first RFID tag 41A and the second RFID tag 41B of the present embodiment are sticker type RFID tags having a card shape and one of the card surfaces serving as an adhesive surface.

The adhesive surface of the first RFID tag 41A is adhered to the windshield 20E. The adhesive surface of the second RFID tag 41B is adhered to the attachment portion 20C.

Furthermore, the first RFID tag 41A and the second RFID tag 41B are formed so as to have a plurality of cuts across the entire card surface. Accordingly, the first RFID tag 41A and the second RFID tag 41B are configured such that, in a case where they are once adhered and then forcibly peeled off, they will be damaged or an electrical resistance value between internal wiring thereof will increase.

In the present embodiment, the first RFID tag 41A is attached to the inner surface 20S of the windshield 20E, but the first RFID tag 41A may be attached to any portion of the main vehicle body 20A as long as it is in a position capable of communicating with the RFID reader 40 regardless of whether the towed vehicle 20B is being towed or not being towed. For example, the first RFID tag 41A may be attached to the outer surface of the windshield 20E, the upper surface of the hood of the main vehicle body 20A, the upper surface of the dashboard of the main vehicle body 20A, the roof of the vehicle body 20A, and the like.

In the present embodiment, the second RFID tag 41B is attached to the attachment portion 20C of the main vehicle body 20A, but the second RFID tag 41B may be attached to any portion of the main vehicle body 20A as long as it is within a region in which, in a plan view from the Z direction as illustrated in FIG. 4, the main vehicle body 20A and the towed vehicle 20B attached to the attachment portion 20C overlap. For example, the second RFID tag 41B may be provided on the periphery of the attachment portion 20C.

In order to improve communication reliability, the first RFID tag 41A and the second RFID tag 41B may be configured to be adhered to the main vehicle body 20A via a magnetic sheet or the like. When the magnetic sheet is used, the magnetic sheet may also include the cuts, similarly to the first RFID tag 41A and the second RFID tag 41B, such that in a case where the magnetic sheet is once adhered and then forcibly peeled off, the first RFID tag 41A and the second RFID tag 41B will be damaged.

Further, as necessary, as illustrated in FIG. 2, a third RFID tag 41C may be further provided as a third onboard unit, in a position on the upper surface of the rear end of the towed vehicle 20B so as to be capable of communicating with the RFID reader 40.

Further, the first RFID tag 41A and the second RFID tag 41B may be configured to sense the damage due to being forcibly peeled off or the increase in the resistance value between the internal wiring, and may transmit a tamper alarm signal to the RFID reader 40. In this case, by the tamper alarm signal to be transmitted, the damage or the increase in the resistance value between the internal wiring is reported to the charging communication processor 50 and the central payment processor 70 via the RFID reader 40.

The RFID reader 40 may further include an RSSI detector that detects the RSSI (the received signal strength) of electromagnetic waves, and may detect that the second RFID tag 41B has been forcibly peeled off.

For example, when receiving the RFID information, in a case where each RSSI of the electromagnetic waves received from the first RFID tag 41A and the second RFID tag 41B is detected, the RFID reader 40 can compare an installation height of the first RFID tag 41A and the second RFID tag 41B.

The second RFID tag 41B is installed in a relatively low position, as the position to be shielded by the towed vehicle 20B. For example, in a case where the second RFID tag 41B is detected as being higher than the first RFID tag 41A, the second RFID tag 41B may be installed in an unauthorized position.

In the case that, using the RSSI detection, it is detected that the second RFID tag 41B is installed in an unauthorized position, the RFID reader 40 generates the tamper alarm, and reports to the charging communication processor 50 and the central payment processor 70.

Configuration of Charging Communication Processor 50

Figure 5:
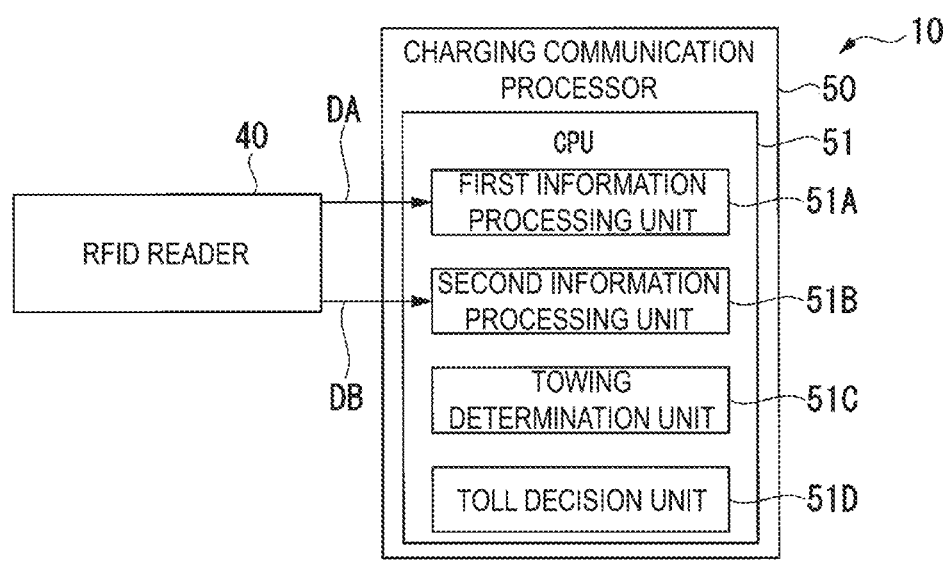
FIG. 5 is a block diagram of a vehicle identification system according to the first embodiment of the present invention.

The charging communication processor 50 includes a Central Processing Unit (CPU) 51. As illustrated in FIG. 5, the CPU 51 functionally includes a first information processing unit 51A, a second information processing unit 51B, a towing determination unit 51C, and a toll decision unit 51D.

In the present embodiment, a program to be described below is executed by the charging communication processor 50, thus causing the CPU 51 to function as the first information processing unit 51A, the second information processing unit 51B, the towing determination unit 51C, and the toll decision unit 51D.

The first information processing unit 51A acquires the first information DA including the vehicle ID information and the vehicle type information of the vehicle 20 received by the RFID reader 40, and identifies the type of the vehicle 20 from the vehicle type information.

Specifically, the first information processing unit 51A is configured to identify, from the first information DA, at least a type having a towing structure, such as a trailer. When the vehicle 20 is the type having the towing structure, such as the trailer, the first information processing unit 51A identifies the main vehicle body 20A as the type having the towing structure, such as the trailer, regardless of the presence or absence of the towed vehicle 20B.

The second information processing unit 51B initiates a standby for the second information DB from the RFID reader 40 relating to the type identified by the first information processing unit 51A, and acquires the second information DB including the vehicle ID information of the vehicle 20 received by the RFID reader 40.

Specifically, the second information processing unit 51B is configured to initiate the standby for the second information DB from the RFID reader 40 when the first information processing unit 51A identifies the passing main vehicle body 20A as the vehicle having the towing structure, such as the trailer.

Thus, the second information processing unit 51B can acquire the second information DB when the passing main vehicle body 20A is the vehicle having the towing structure, such as the trailer.

The towing determination unit 51C determines the presence or absence of the towed vehicle 20B of the main vehicle body 20A.

Specifically, when the second information processing unit 51B acquires the second information DB after initiating the standby for the second information DB, the towing determination unit 51C determines that the main vehicle body 20A is not towing the towed vehicle 20B.

When the second information processing unit 51B does not acquire the second information DB after initiating the standby for the second information DB, the towing determination unit 51C determines that the main vehicle body 20A is towing the towed vehicle 20B.

The towing determination unit 51C determines the presence or absence of the towed vehicle 20B depending on whether it has been possible to acquire the second information DB.

In the present embodiment, when the second information processing unit 51B is unable to acquire the second information DB during a period from a timing of the start of the determination to a timing at the end of the determination, the towing determination unit 51C determines that the main vehicle body 20A is towing the towed vehicle 20B.

When the second information processing unit 51B is able to acquire the second information DB during the period from the timing of the start of the determination to the timing at the end of the determination, the towing determination unit 51C determines that the main vehicle body 20A is not towing the towed vehicle 20B.

In the present embodiment, the timing of the start of the determination is a time at which the standby for the second information DB is initiated, but as a modified example, the timing of the start of the determination may be a time at which the RFID reader 40 or the charging communication processor 50 receives the first information DA, or may be a time at which the entry-side vehicle detector 91 detects the vehicle 20.

In the present embodiment, the timing of the end of the determination is after a predetermined period of time from the timing of the start of the determination. However, as a modified example, the timing of the end of the determination may be a time at which the departure-side vehicle detector 93 detects the departure of the vehicle 20, or may be after a predetermined period of time from the departure of the vehicle 20.

As another modified example, when the vehicle 20 is provided with the third RFID tag 41C described above, the timing of the end of the determination may be a time at which the RFID reader 40 or the charging communication processor 50 receives information from the third RFID tag 41C, or may be after a predetermined amount of time from receiving the information.

The toll decision unit 51D identifies the vehicle type from the first information DA including the vehicle type information, and decides a toll charge amount that accords with the identified vehicle type and the presence or absence of the towed vehicle.

Vehicle Identification Method

An embodiment of a vehicle identification method according to the present invention will be described below, using the vehicle identification system 10. Hereinafter, a case is described as an example in which, when the main vehicle body 20A is the trailer that does not tow the towed vehicle 20B, the toll is discounted, from standard toll charge for the trailer, by an amount corresponding to the fact that the towed vehicle 20B is not being towed.

Figure 6:
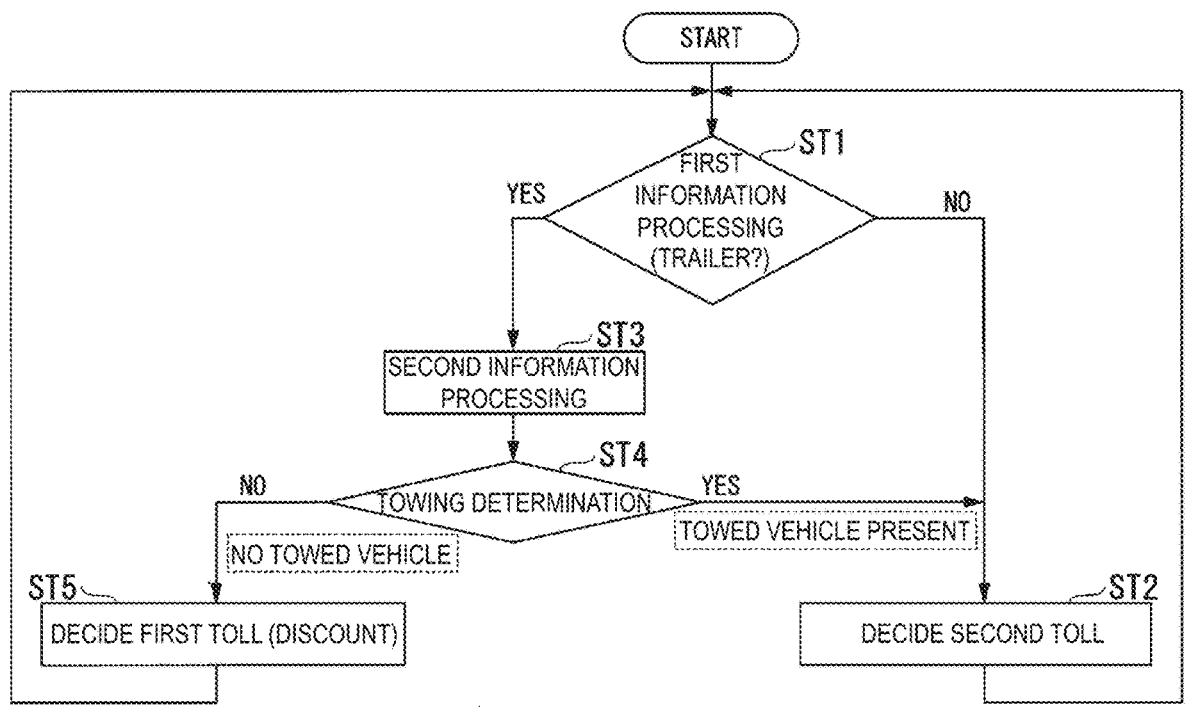
FIG. 6 is a flowchart of a vehicle identification method of the vehicle identification system according to the first embodiment of the present invention.

As illustrated in FIG. 6, the first information processing unit 51A acquires the first information DA including the vehicle ID information and the vehicle type information of the main vehicle body 20A from the first RFID tag 41A, and identifies the type of the main vehicle body 20A from the vehicle type information (ST1: a first information processing step).

When the first information processing unit 51A identifies the type of the main vehicle body 20A as a type other than the "trailer" (ST1: NO) at the first information processing step ST1, the toll decision unit 51D decides, as the toll charge amount, a toll charge corresponding to the determined type (ST2: a second toll deciding step).

When the first information processing unit 51A identifies the type of the main vehicle body 20A as the "trailer" (ST1: YES) at the first information processing step ST1, the second information processing unit 51B initiates the standby for the second information DB from the second RFID tag 41B attached to the main vehicle body 20A (ST3: a second information processing step).

Following the second information processing step ST3, the towing determination unit 51C determines the presence or absence of the towed vehicle 20B, depending on whether the second information processing unit 51B has been able to acquire the second information DB (ST4: a towing determining step).

At the towing determination step ST4, when the towing determination unit 51C determines that the main vehicle body 20A is not towing the towed vehicle 20B (ST4: NO), the toll decision unit 51D calculates the toll by discounting the standard toll charge relating to the "trailer" by the amount corresponding to the fact that the towed vehicle 20B is not being towed, and decides the discounted toll as the toll charge amount (ST5: a first toll deciding step).

At the towing determination step ST4, when the towing determination unit 51C determines that the main vehicle body 20A is towing the towed vehicle 20B (ST4: YES), advancing to the second toll determining step ST2, the toll decision unit 51D decides the toll corresponding to the identified type (the standard toll charge corresponding to the "trailer") as the toll charge amount.

Hardware Configuration

Further, an example of the hardware configuration of the charging communication processor 50 in the above-described embodiments will be described.

Figure 7:
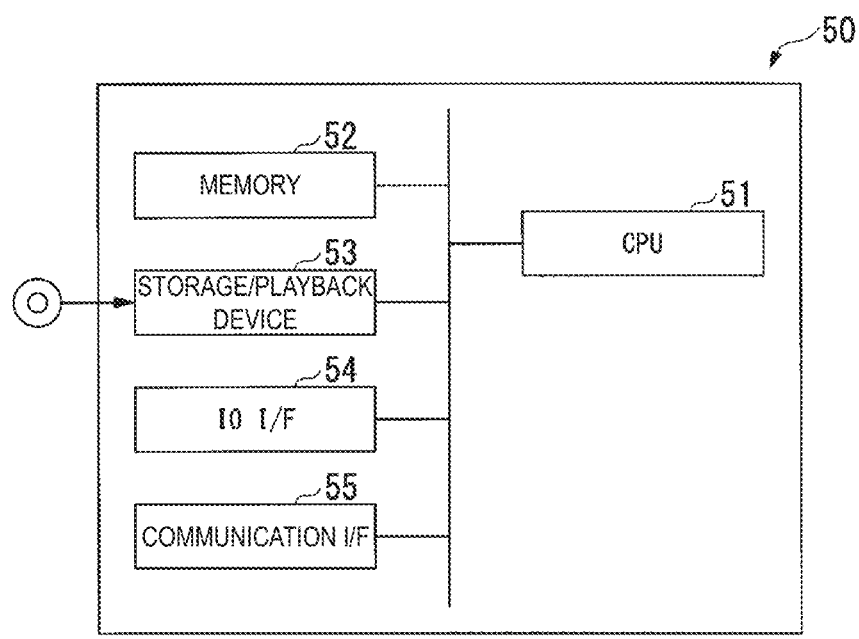
FIG. 7 is a diagram illustrating an example of a hardware configuration of a charging communication processor according to the first embodiment of the present invention.

FIG. 7 is a diagram illustrating an example of the hardware configuration of the charging communication processor 50.

As illustrated in FIG. 7, in addition to the CPU 51, the charging communication processor 50 further includes a memory 52, a storage/playback device 53, an Input Output Interface (IO I/F) 54, and a communication Interface (I/F) 55.

The memory 52 is a medium such as a Random Access Memory (RAM) that temporarily stores data and the like used by programs of the charging communication processor 50.

The storage/playback device 53 is a device for storing data and the like in an external medium such as a CD-ROM, a DVD, or a flash memory, playing back data from the external medium, and the like.

The IO I/F 54 is an interface for inputting and outputting information and the like between the charging communication processor 50 and the various devices of the toll collection facility 1.

The communication I/F 55 is an interface that performs communication between the charging communication processor 50 and the central payment processor 70, via a communication circuit such as the Internet, a dedicated communication circuit, or the like.

Method for Attaching Onboard Unit

Figure 8:
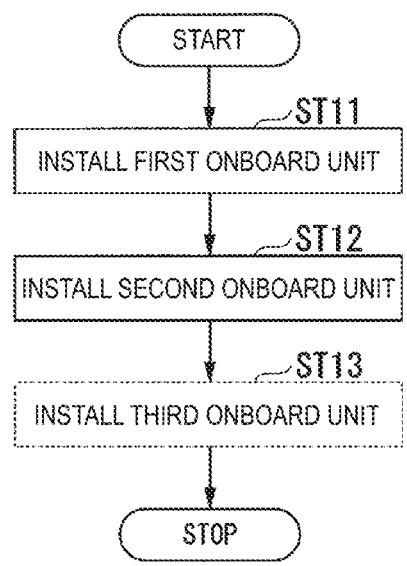
FIG. 8 is a flowchart of a method for attaching an onboard unit to a main vehicle body according to the first embodiment of the present invention.

As an embodiment of a method for attaching the onboard unit according to the present invention, a method for attaching each of the RFID tags on the vehicle 20 will be described with reference to FIG. 8.

An installation operator places the first RFID tag 41A in a position capable of communicating with the RFID reader 40 in either the state in which the towed vehicle 20B is attached to the attachment portion 20C or the state in which the towed vehicle 20B is unattached (ST11: a first onboard unit installing step). In the present embodiment, as illustrated in FIG. 4, the installation operator adheres the first RFID tag 41A to the inner surface 20S of the windshield 20E of the main vehicle body 20A.

Next, the installation operator installs the second RFID tag 41B in a position capable of communicating with the RFID reader 40 in the state in which the towed vehicle 20B is not attached to the attachment portion 20C, and in a position not capable of communicating with the RFID reader 40 in the state in which the towed vehicle 20B is attached to the attachment portion 20C (ST12: a second onboard unit installing step). In the present embodiment, as illustrated in FIG. 4, the installation operator adheres the second RFID tag 41B to the attachment portion 20C.

In the present embodiment, the second onboard unit installing step ST12 is performed after the first onboard unit installing step ST11, but the first onboard unit installing step ST11 may be performed after the second onboard unit installing step ST12.

Furthermore, as necessary, the installation operator may install the third RFID tag 41C on the towed vehicle 20B (ST13: a third onboard unit installing step).

In this case, the third RFID tag 41C is installed in a position capable of communicating with the RFID reader 40 in both the state in which the towed vehicle 20B is attached to the main vehicle body 20A and in the unattached state. For example, the installation operator attaches the third RFID tag 41C to the upper surface of the rear end of the towed vehicle 20B.

Also, when the third onboard unit installing step ST13 is provided, ST11 to ST13 may be performed in any order.

Actions and Effects

The actions and effects of the present embodiment will be described.

In the present embodiment, a communication state between the second RFID tag 41B of the main vehicle body 20A and the RFID reader 40 switches depending on the presence or absence of the towed vehicle 20B. Specifically, the second RFID tag 41B of the main vehicle body 20A is not capable of communicating with the RFID reader 40 in the state in which the towed vehicle 20B is attached, and is capable of communicating with the RFID reader 40 in the state in which the towed vehicle 20B is not attached.

Accordingly, the vehicle 20 is able to receive the determination of the presence or absence of the towed vehicle 20B, using small scale equipment. Additionally, the vehicle identification system 10 is able to determine the presence or absence of the towed vehicle 20B of the vehicle 20, using small scale equipment.

When the vehicle identification system 10 of the present embodiment acquires the second information DB from the second RFID tag 41B, it is determined that the main vehicle body 20A is not towing the towed vehicle 20B, and the discounted toll from the standard toll charge is taken as the toll charge amount.

It is assumed that, in a case where the third RFID tag 41C described above is used as the RFID tag for determining the presence or absence of the towed vehicle 20B, a configuration is adopted in which the toll charge is discounted when communication is not possible with the third RFID tag 41C. In this case, for example, by damaging or hiding the third RFID tag 41C, and thus fraudulently making the communication with the third RFID tag 41C impossible, it is possible to pass through at a cheap toll charge amount.

In contrast, by applying the cheap toll charge amount when communication with the second RFID tag 41B is possible, as in the present embodiment, the cheap toll charge amount is not obtained by damaging or hiding the second RFID tag 41B, so the vehicle identification system 10 can prevent fraudulence.

The vehicle identification system 10 of the present embodiment can determine the presence or absence of the towed vehicle 20B without detecting the number of axes or measuring the length of the vehicle 20, and the like.

Therefore, the presence or absence of the towed vehicle 20B can be determined without a large scale instrument, such as an axial number detection device or a vehicle length measurement device of the vehicle 20.

Additionally, by using the RFID tag as each of the onboard units, the onboard unit itself and the roadside devices can be configured at a low cost.

Furthermore, the second RFID tag 41B of the main vehicle body 20A uses electromagnetic shielding by the towed vehicle 20B to switch the communication state with the RFID reader 40. The towed vehicle 20B and fixtures thereof need to be formed from a normally robust material, and therefore are configured by, for example, thick metal, and have a structure that inhibits the transmission of electromagnetic waves. Thus, when the towed vehicle 20B is attached to the main vehicle body 20A, the second RFID tag 41B of the main vehicle body 20A is not able to communicate with the RFID reader 40 because the communication path with the RFID reader 40 is electromagnetically shielded by the towed vehicle 20B.

Accordingly, the vehicle 20 can cause the communication between the second RFID tag 41B and the RFID reader 40 to be impossible, in conjunction with the attachment of the towed vehicle 20B to the attachment portion 20C of the main vehicle body 20A.

Other Modifications

The vehicle identification system 10 of the present embodiment reads the vehicle type information read by the RFID reader 40 and thus identifies the type of each vehicle, but, as a modified example, may also simply identify the type having the towing structure, such as the trailer.

For example, in a case of simply determining the presence or absence of a towed vehicle of a trailer, it is sufficient that only information indicating whether or not the vehicle is a trailer is stored in the first RFID tag 41A as the vehicle type information, and it is sufficient that the vehicle identification system 10 only determines, as the vehicle identification, whether the main vehicle body 20A is the trailer or is other than the trailer.

The vehicle identification system 10 of the present embodiment utilizes the possibility of the communication with the second RFID tag 41B in the determination of the presence or absence of the towed vehicle, but, as a modified example, a configuration may be adopted in which the third RFID tag 41C described above is provided, and the possibility of the communication with the third RFID tag 41C may be used in addition to the possibility of the communication with the second RFID tag 41B. In this case, for example, it is determined that the main vehicle body 20A is not towing the towed vehicle 20B when the communication with the second RFID tag 41B is possible and the communication with the third RFID tag 41C is not possible. This allows the discount from the standard toll charge to be implemented only when standard communication is performed.

Second Embodiment

A second embodiment of a charging system according to the present invention is described below with reference to FIG. 9.

A charging system 100' and a vehicle 20' of the present embodiment are basically the same as in the first embodiment, except in that charging processing by an ETC antenna 140 and an ETC onboard unit 141 that use ETC (Electronic Toll Collection System (trade name)) is also performed. The differences are described in detail below.

Figure 9:
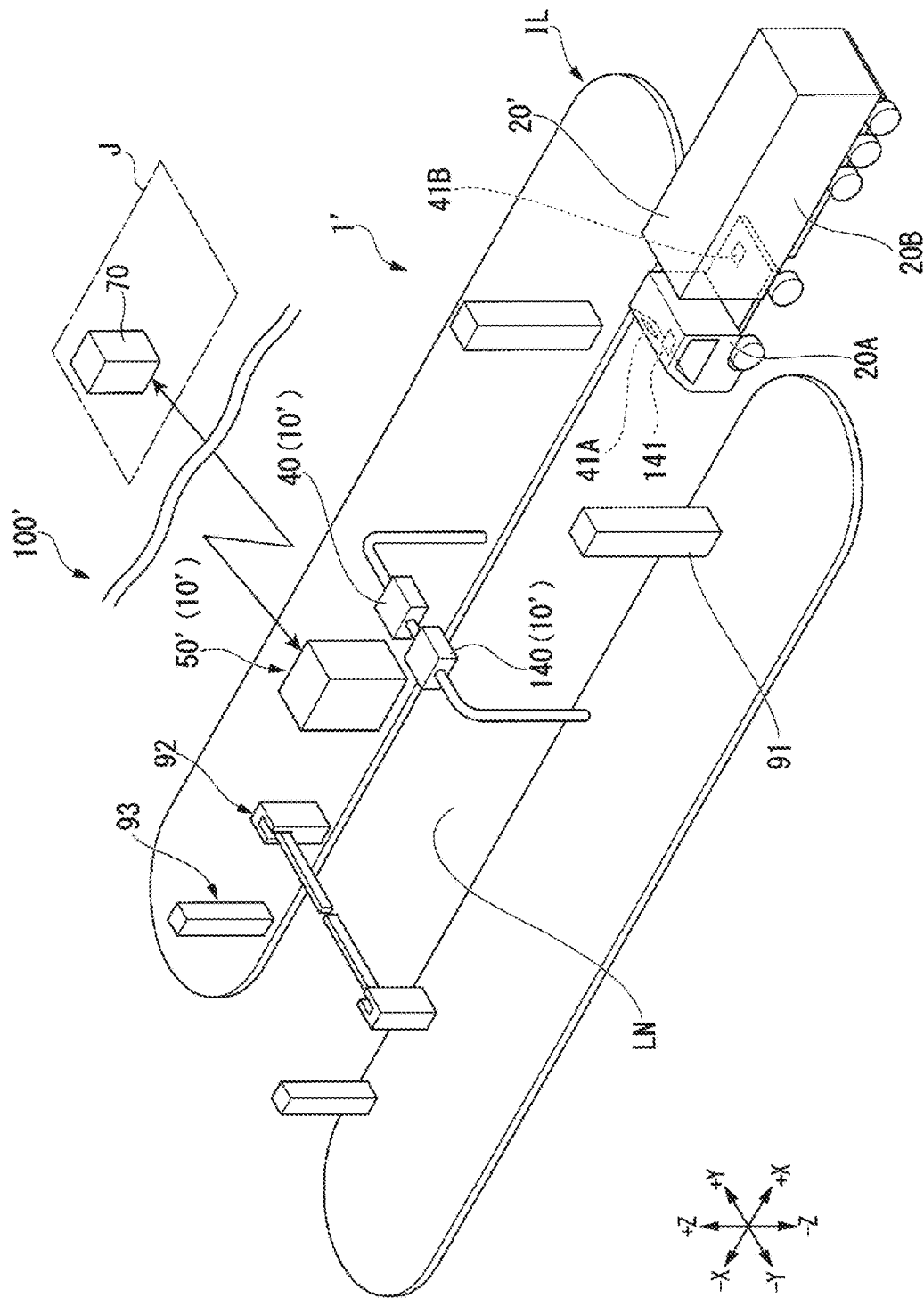
FIG. 9 is a schematic diagram of a charging system according to a second embodiment of the present invention.

As illustrated in FIG. 9, the charging system 100' includes a toll collection facility 1' and the central payment processor 70.

As illustrated in FIG. 9, a vehicle identification system 10' of the toll collection facility 1' includes the RFID reader 40, the ETC antenna 140, and a charging communication processor 50'.

The vehicle 20' includes the main vehicle body 20A, the first RFID tag 41A, the second RFID tag 41B, and the ETC onboard unit 141.

The ETC onboard unit 141 is attached to the main vehicle body 20A and is disposed so as to be capable of communicating with the ETC antenna 140.

The ETC antenna 140 is installed above the traveling vehicle 20'. The ETC antenna 140 is provided so as to be located at almost the same position as the RFID reader 40 in the lane direction (the ±X direction), and so as to be aligned with the RFID reader 40 in the Y direction.

Specifically, the ETC antenna 140 is formed to be capable of transmitting and receiving an electromagnetic wave of a predetermined frequency (approximately 5.8 GHz, for example) and performs wireless communication with the ETC onboard unit 141 mounted on the arriving vehicle 20', via the electromagnetic wave. The frequency of the electromagnetic wave used by the RFID reader 40 in the wireless communication may be the same as or different from each frequency of the electromagnetic wave used by the ETC antenna 140 in the wireless communication.

When the entry of the vehicle 20' is detected by the entry-side vehicle detector 91, the ETC antenna 140 performs the wireless communication with the ETC onboard unit 141 of the vehicle 20', and receives detailed information DC (the vehicle ID, the vehicle type, card information, entry information, and the like) of the passing vehicle 20'.

Further, the ETC antenna 140 transmits charging data including a result of the charging processing to the ETC onboard unit 141 of the passing vehicle 20'.

Figure 10:
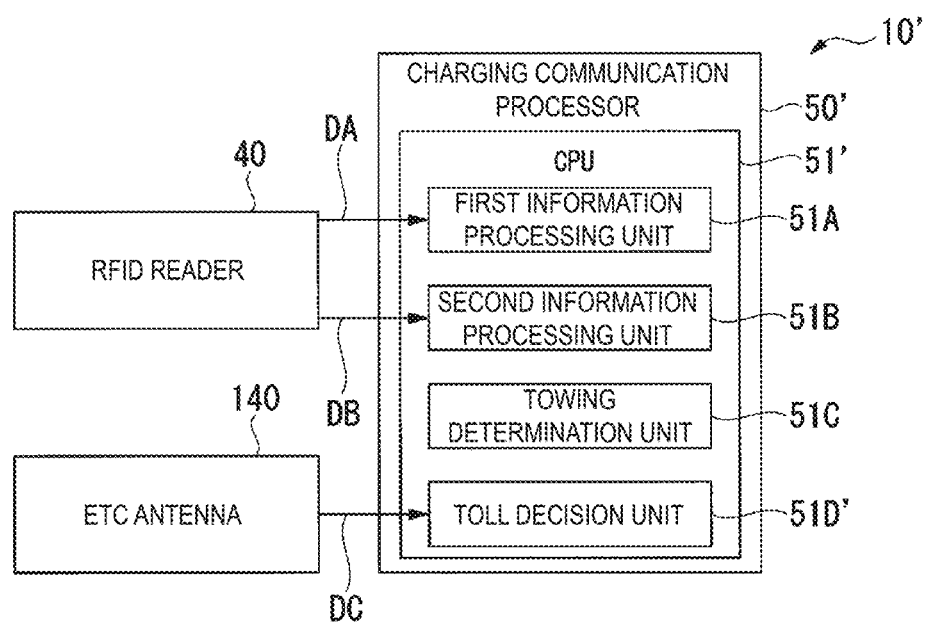
FIG. 10 is a block diagram of a vehicle identification system according to the second embodiment of the present invention.

The charging communication processor 50' includes a CPU 51'. As illustrated in FIG. 10, the CPU 51' functionally includes the first information processing unit 51A, the second information processing unit 51B, the towing determination unit 51C, and a toll decision unit 51D'.

The charging communication processor 50' receives the detailed information DC of the vehicle 20' received by the ETC antenna 140, from the ETC antenna 140 using wired or wireless communication. At this time, the toll decision unit 51D' decides the toll charge amount on the basis of the detailed information DC received from the ETC antenna 140 and a determination result of the presence or absence of the towed vehicle 20B by the towing determination unit 51C. For example, even when the main vehicle body 20A is a trailer that is not towing the towed vehicle 20B, the toll decision unit 51D' provisionally calculates the standard toll charge for the trailer from the detailed information DC. Subsequently, in correspondence with the determination result of the towing determination unit 51C, the toll decision unit 51D' calculates a toll charge obtained by discounting, from the calculated standard toll charge, an amount corresponding to the fact that the towed vehicle 20B is not being towed, and decides the amount as the toll charge amount.

The vehicle 20' of the present embodiment is provided with the first RFID tag 41A, but need not necessarily include the first RFID tag 41A, as a modified example. In this case, the charging communication processor 50' acquires the first information DA from the ETC onboard unit 141 via the ETC antenna 140.

In the embodiments described above, the various processes are implemented by a program for achieving the various functions of the charging communication processor, the program being stored in a computer-readable storage medium, and the program stored in the storage medium being read and executed by a computer system. The steps of each process of each CPU described above are stored in a computer readable recording medium in the form of a program, and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication line, and the computer that receives this distribution may execute the program.

Moreover, a mode may be employed in which various functions of the charging communication processor are provided in a plurality of devices connected by a network.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

For example, the first onboard unit and the second onboard unit may be any combination of active, passive, having a power supply, and not having a power supply.

Further, in the present embodiment, the RFID tag is used as the first to third onboard units and the RFID reader is used as the roadside device. However, as long as a communication device is capable of performing communication between the traveling vehicle and the roadside, any communication device may be used as the first to third onboard units and as the roadside device.

INDUSTRIAL APPLICABILITY

According to an aspect of the present invention, the presence or absence of a towed vehicle can be determined using small scale equipment.

The invention claimed is:

1. A vehicle comprising:
a main vehicle body including an attachment portion to which a towed vehicle is attachable; and
a first onboard unit and a second onboard unit that are attached to the main vehicle body and disposed so as to be capable of communicating with a roadside device, wherein
the first onboard unit holds type information relating to a type of the main vehicle body and is provided at a position at which the first onboard unit is capable of communicating with the roadside device in a state in which the towed vehicle is attached to the attachment portion and in a state in which the towed vehicle is not attached, and
the second onboard unit is provided at a position at which the second onboard unit is capable of communicating with the roadside device in the state in which the towed vehicle is not attached to the attachment portion and is not capable of communicating with the roadside device in the state in which the towed vehicle is attached to the attachment portion.

2. The vehicle according to claim 1, wherein the second onboard unit includes an RFID tag.

3. The vehicle according to claim 1, wherein in the state in which the towed vehicle is attached to the attachment portion, the second onboard unit is electromagnetically shielded by the towed vehicle so as to be incapable of communicating with the roadside device.

4. A vehicle identification system comprising:
a roadside device configured to receive, from a first onboard unit attached to a main vehicle body, which is a main vehicle body of a vehicle and which includes an attachment portion to which a towed vehicle is attachable, first information including type information relating to a type of the main vehicle body, and configured to receive second information from a second onboard unit attached to the main vehicle body;
a first information processing unit configured to acquire the first information from the roadside device and to identify the type of the main vehicle body from the type information;
a second information processing unit configured to initiate, in relation to the identified type, a standby for the second information from the roadside device; and
a towing determination unit configured to determine that the main vehicle body is not towing the towed vehicle when the second information processing unit acquires the second information, and configured to determine that the main vehicle body is towing the towed vehicle when the second information processing unit does not acquire the second information.

5. A vehicle identification method comprising:
a first information processing step of acquiring, from a first onboard unit attached to a main vehicle body, which is a main vehicle body of a vehicle and which includes an attachment portion to which a towed vehicle is attachable, first information including type information relating to a type of the main vehicle body, and identifying a type of the main vehicle body from the type information;
a second information processing step of initiating, in relation to the identified type, a standby for second information from a second onboard unit attached to the main vehicle body; and
a towing determining step of determining that the main vehicle body is not towing the towed vehicle when the second information is acquired in the second information processing step, and determining that the main vehicle body is towing the towed vehicle when the second information is not acquired in the second information processing step.

\* \* \* \* \*